United States Patent

[11] 3,624,058

[72] Inventor August H. Jorgensen, Jr.
Avon Lake, Ohio
[21] Appl. No. 727,083
[22] Filed May 6, 1968
[45] Patented Nov. 30, 1971
[73] Assignee The B. F. Goodrich Company
New York, N.Y.

[54] POLYMERS OF VULCANIZABLE ALKYL ESTERS OF ACRYLIC ACID AND ALLYL CHLOROACETATE
8 Claims, No Drawings

[52] U.S. Cl. .................................... 260/86.1,
204/159.22, 260/29.6, 260/41, 260/45.7,
260/45.9, 260/45.95, 260/63, 260/78.5, 260/79.5,
260/80.6, 260/80.73, 260/80.76, 260/80.8,
260/80.81, 260/85.5
[51] Int. Cl. ...................................... C08f 15/20
[50] Field of Search .......................... 260/85.5,
85.5 OT, 86.1 E, 80.6, 80.81

[56] References Cited
UNITED STATES PATENTS
2,635,092 4/1953 Ham .......................... 260/85.5 Orig
2,643,992 6/1953 Glusenkamp et al. ........ 260/85.5 Orig
3,288,763 11/1966 Waldron ..................... 260/86.1
3,488,331 1/1970 Jorgensen ................... 260/86.1 E Primary Examiner—Harry Wong, Jr.
Attorneys—J. Hughes Powell, Jr. and Ernest K. Bean ABSTRACT: Allyl chloroacetate is copolymerized with alkyl esters of acrylic acid to provide elastomers containing less than about 10 percent allyl chloroacetate which are essentially gel free, and in a vulcanized state have improved resistance to heat.

POLYMERS OF VULCANIZABLE ALKYL ESTERS OF ACRYLIC ACID AND ALLYL CHLOROACETATE

BACKGROUND OF THE INVENTION

Many alkyl acrylate copolymers have been prepared to provide improved cure systems for acrylic elastomers. Such copolymers include, for example, alkyl acrylates as ethyl acrylate with one to five parts of copolymerizable vinylidene monomers including for example, halogen-containing monomers such as chloroethyl vinyl ether, chloroethyl acrylate and the like. While such copolymers are cured in a variety of systems, and while the vulcanizates have many of useful physical properties, it is desired to have acrylate vulcanizates with improved resistance to heat.

SUMMARY OF THE INVENTION

I have now discovered that essentially gel-free elastomers with improved resistance to heat are obtained with alkyl acrylate copolymers containing about 0.5 to less than 10 parts of allyl chloroacetate. It was quite surprising to find that allyl chloroacetate polymerized so readily with the acrylic acid esters. Normally, the allyl function copolymerizes poorly with monomers as active as the alkyl acrylates. Further, it was also surprising to find that the polymers were essentially gel free and that vulcanizates thereof have excellent resistance to heat.

DETAILED DESCRIPTION

The acrylic elastomers of this invention contain the allyl chloroacetate copolymerized with esters of acrylic acid having the structure

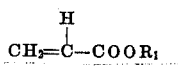

wherein $R_1$ is an alkyl group having from one to 10 carbon atoms, β-cyanoethyl and cyanoalkyl groups having from two to eight carbon atoms. Representative lower alkyl acrylic esters are methyl acrylate, ethyl acrylate, propyl acrylate, butyl acrylates, amyl acrylates, hexyl acrylates, cyclohexyl acrylate, heptyl acrylates, and octyl acrylates; the cyanoalkyl acrylates such as α-cyanomethyl acrylate, α-cyanoethyl acrylate, β-cyanoethyl acrylate, the α,β and γ-cyanopropyl acrylates, cyanobutyl acrylates, cyanoamyl acrylates, cyanohexyl acrylates, cyanoheptyl acrylates; and the like. Mixtures of acrylates may be used. Most preferred in the present invention are the alkyl and cyanoalkyl esters in which the alkyl group contains from one to four carbon atoms. The amount of allyl chloroacetate employed preferably is an amount from about 1 to 5 percent. Copolymers containing about 0.2 to about 1 percent bound chlorine provided by interpolymerized allyl chloroacetate are particularly useful, preferably about 0.3 to 0.6 percent chlorine.

Other vinylidene monomers having a terminal

group may be employed with the essential monomers so long as an elastomeric material is obtained. Normally, less than about 10 percent other vinylidene monomers will be used, as vinylidene chloride, vinyl chloride, methacrylonitrile, vinyl ethers, octyl methacrylate and the like. Other copolymerizable monomers include such vinyl monomers as acrylonitrile, the styrenes as styrene, α-methyl styrene, vinyl toluene, chlorostyrene, nitrostyrene, vinyl chloride, vinylidene chloride, vinyl acetate, alkyl vinyl ethers, alkyl vinyl ketones, acrylic acid, methacrylic acid, methyl methacrylate, ethyl methacrylate, methyl ethacrylate, acrylamide, methacrylamide, N-methylol acrylamide, octyl acrylate, alkyl fumarates and the like; and while not required, since adequate vulcanization is obtained with the allyl chloroacetate components of this invention, chloroethyl vinyl ether, chloroethyl acrylate, and the like.

The acrylic elastomers of this invention normally have glass or second order transition temperature below about 10° C. The interpolymers are readily prepared by methods employed by those skilled in the art in providing acrylic elastomers. While such polymerizations may be conducted in bulk or in solution, the preferred method is to polymerize the monomers in water in an aqueous dispersion. The polymerizations may be conducted in batch reactions or the monomers may be proportioned to a reactor containing water and other polymerization additives. The polymerizations may be conducted over a wide temperature range as from −10° to 95° C. While heat and ultraviolet light may be used, better results are generally obtained at temperatures in the range of about 5° to about 50° C. in the presence of water containing a free radical generating catalyst and surface active agents.

The catalyst employed may be any of those free radical forming and other catalysts known to those skilled in the art including both organic and inorganic peroxides, inorganic persulfates, organic hydroperoxides, azo compounds, the well known redox catalyst systems, and reduced metal catalysts. Other additives to the water will include acids or bases to adjust the pH of the aqueous dispersion which usually is in the range of about 4 to 8; buffers, inorganic salts and surface active agents. Since some of the alkyl acrylates are soluble in water only minimum amounts of surface active agents are normally required to form polymers. Larger amounts normally will be employed to form polymers. Larger amounts normally will be employed when stable latices are desired. Such surface active agents may include anionic, cationic and nonionic materials. Typical surface active agents found useful in preparing the interpolymers include sodium alkyl sulfates as sodium lauryl sulfates, sodium alkyl aryl sulfonates as sodium naphthalene sulfonate, quaternary salts, polyglycol fatty acid esters and the like. As is obvious, the catalysts, surface active agents, nand other polymerization conditions are not critical to obtaining the improved interpolymers of this invention. If the interpolymers are prepared in the form of latices and not used as such, the elastomers are normally isolated from the latex by coagulation with salt-acid, polyvalent metal salts, alcohol, and the like, and the resulting solid interpolymer washed with water and dried. The examples represent only one method for preparing the acrylic elastomers. Cements may be prepared by polymerization in a solvent or dissolving the dry polymer in a solvent.

The resulting dried elastomers may contain or have added thereto stabilizers which are effective as antioxidants and antiozonants, and in many cases improved heat resistance of the elastomers is obtained by use of such stabilizers and organic phosphites. Use of both phosphites and other antioxidants as the phenol derivatives are suggested. The usual antioxidants and stabilizers may be added to the rubber in latex state, milled or in cements. Aryl phenols are preferred as they are nonstaining, but aryl amines may be used. Age resistors and antioxidants of the known type such as octylated diphenylamines, styrenated phenols, polyalkyl polyphenols, PBNA, and others, may be used.

The novel polymers of this invention may be compounded with a variety of vulcanizing agents. Examples of the vulcanization systems which can be used with these acrylic elastomers are fatty acid soaps and dipentamethylene thiuram hexasulfide, fatty acid soap and sulfur, hexamethylene diamine, triethylene diamine, ammonium benzoate, ammonium adipate, ammonium stearate, zinc dimethyl dithiocarbamate sulfur and phenylene diamine, dicyandimide with azelaic acid and the like. Also useful for special compounds are plasticizers, softeners, and tackifiers; and reinforcing pigments, for example, the various carbon blacks, both channel and furnace, inert fillers and diluents. All may be used as will be understood by those skilled in the compounding art.

EXAMPLES

A series of copolymers were prepared with the monomers set forth in the data table below, according to a polymerization recipe using, in weight parts: 100 water, 0.072 sodium hydroxide, 2.10 alkyl phenoxypoly(ethyleneoxy)ethyl ester of phosphoric acid, 0.01 of the sodium ferric salt of ethylenediamine tetraacetic acid, 100 of monomers, 0.3 sodium sulfate, 0.024 tetrasodium ethylenediamine tetraacetate, 0.04 sodium formaldehyde sulfoxylate, 0.02 sodium hydrosulfite and 0.04 paramenthane hydroperoxide. The reaction was conducted at a temperature of 30° C. and the monomers proportioned over a 2 hour period. The initial pH of the water-emulsifier mixture was between 6 and 7. The polymers were coagulated with calcium chloride solution, washed and dried.

| Example | 1 | 2 | 3 | 4 | 5 |
|---|---|---|---|---|---|
| Ethyl acrylate, parts | 98.8 | 97 | 98.66 | 96.66 | 94.69 |
| Vinyl chloroacetate, parts | 1.2 | 3.0 | | | |
| Allyl chloroacetate, parts | | | 1.34 | 3.33 | 5.31 |
| Percent gel (0.4 MEK) | 83.6 | 89.1 | 0.7 | 0.2 | 3.1 |
| Swelling index | 36 | 31 | 4 | 6 | 9 |
| Dilute solution viscosity | 1.76 | 0.93 | 3.19 | 2.55 | 2.50 |
| Percent chlorine | 0.34 | 0.75 | 0.17 | 0.37 | 0.69 |

The dry polymers were compound to the following recipe:

| Polymer | 100 |
|---|---|
| FEF Carbon black | 65 |
| Stearic acid | 2 |
| Phenyl-β-naphthylamine | 2 |
| Spider sulfur (sulfur dispersed with manganese carbonate) | 0.3 |
| Sodium stearate | 0.75 |
| Potassium stearate | 2.25 |

The compounds were vulcanized at 338° F. for 4 minutes and tempered at 347°. The resulting vulcanizates had the following physical properties:

| | | | | | |
|---|---|---|---|---|---|
| 100% Modulus p.s.i. | 680 | 630 | 610 | 750 | 740 |
| Tensile strength p.s.i. | 1730 | 1670 | 1750 | 1540 | 1520 |
| Elongation % | 330 | 330 | 350 | 300 | 300 |
| Compression set* 70 hours/302° F. | 18 | 42 | 15 | 27 | 31 |

*Tempered 8 hours at 347° F.—plied discs.

Samples of the vulcanizates were often aged for 70 hours at 400° F. in air in a tube. The stress strain properties after this aging were as follows:

| | | | | | |
|---|---|---|---|---|---|
| 100% Modulus Tensile Strength p.s.i. | Yields | Yields | 310 | 700 | 860 |
| p.s.i. | 220 | 300 | 350 | 830 | 950 |

The unexpected and substantial absence of gel, and improvement in heat resistance after 70 hours at 400° F. in air of allyl chloroacetate polymers, as compared to copolymers made with vinyl chloroacetate is evident from the data. Copolymers of ethyl acrylate and about 5 percent chloroethyl vinyl ether do not vulcanize in the above recipe.

These improved vulcanizable acrylic elastomers are useful in applications where acrylic elastomers have been used in the past and find further uses not generally available to many acrylic elastomers because of better heat resistance. For example, in molded parts subject to attack by heat, as in gaskets, cups, seals and the like. These copolymer materials in an organic solvent solution as MEK may be used for coatings and cements because of good adhesive properties. Latices of the copolymers may be used to impregnate paper for improved products.

I claim:

1. A vulcanizable essentially gel-free elastomeric interpolymer having a second order transition temperature below about 10° C. of about 80 to 99.5 parts of an alkyl ester of acrylic acid having the structure $$CH_2=\overset{H}{\underset{}{C}}-COOR_1$$

wherein $R_1$ is alkyl containing one to 10 carbon atoms, containing about 0.2 to about 1 weight percent chlorine derived from a chloroacetate consisting essentially of allyl chloroacetate copolymerized therewith and less than about 10 parts of a vinylidene monomer having a terminal $$CH_2=C<$$

group.

2. The polymer of claim 1 wherein $R_1$ is an alkyl group containing from one to four carbon atoms.
3. The polymer of claim 1 wherein the amount of allyl chloroacetate is about one to five parts.
4. The polymer of claim 3 wherein the alkyl ester of acrylic acid is ethyl acrylate.
5. The polymer of claim 4 containing about 0.3–0.6 weight percent chlorine derived from said allyl chloroacetate.
6. A vulcanized polymer of claim 1.
7. A vulcanized polymer of claim 4.
8. A vulcanized polymer of claim 5.

* * * * *